United States Patent
Greenaway et al.

[15] 3,643,216
[45] Feb. 15, 1972

[54] HOLOGRAPHIC IDENTIFICATION SYSTEM

[72] Inventors: David Leslie Greenaway, Untereichen, Birchwil; John Patrick Russell, Thalwil, both of Switzerland

[73] Assignee: RCA Corporation

[22] Filed: July 30, 1969

[21] Appl. No.: 846,116

[30] Foreign Application Priority Data

Aug. 6, 1968    Switzerland .........................37512/68

[52] U.S. Cl. ............340/146.3 P, 235/61.12 R, 235/61.7 B, 340/149 A, 350/3.5, 356/71

[51] Int. Cl. .......................................................G06k 9/00

[58] Field of Search ...............340/146.3, 149; 40/2.2; 283/6, 283/7; 194/4; 73/56; 235/61.7 B, 61.115, 61.12 R; 350/3.5; 356/71

[56] References Cited

UNITED STATES PATENTS

| | | | |
|---|---|---|---|
| 2,977,024 | 3/1961 | Harris | 235/61.7 UX |
| 3,392,400 | 7/1968 | Lamberts et al. | 340/146.3 UX |
| 3,439,339 | 4/1969 | Parks | 340/149 |
| 3,532,426 | 10/1970 | Lemmond | 356/71 |
| 3,552,853 | 1/1971 | Sanders et al. | 355/133 |

OTHER PUBLICATIONS

Aristov et al, *Soviet Physics—Doklady,* "Holography Without a Reference Beam," May 1968, Vol. 12, No. 11, pp. 1035-1037

Gabor, *Nature,* "Character Recognition by Holography," Oct. 30, 1965, Vol. 208, pp. 422 and 423

Tait et al, *IBM Technical Disclosure Bulletin,* "Multiple Hologram Readout to Single Diode Array," May 1969, Vol. 11, No. 12, p. 1636

*Primary Examiner*—Maynard R. Wilbur
*Assistant Examiner*—Leo H. Boudreau
*Attorney*—Edward J. Norton

[57] ABSTRACT

An identification card or credit card contains a unique holographically encoded number which may be decoded by a simple decoder requiring only a single flashlight bulb as a light source for reconstructing an image of the holographic code. This reconstructed image comprises a fixed predetermined pattern of a total number of spaced points, some of which, in accordance with the coded number, are manifested by light spots while the rest of the points are manifested by dark spots.

5 Claims, 6 Drawing Figures

HOLOGRAPHIC IDENTIFICATION SYSTEM

This invention relates to a holographic information storage and retrieval system and, more particularly, to such a system which is suitable for providing secure identification cards, credit cards or the like.

Identification or credit cards are in widespread use for such purposes, among others, as permitting the authorized holder thereof to gain access to secure facilities, to purchase goods and services on credit, or to make withdrawals from a numbered Swiss bank account. Such cards may be lost by the authorized holder thereof and found by another. Also, many types of identification or credit cards may be counterfeited or tampered with without too much difficulty by an unauthorized person. It is therefore always desirable, and in some cases of utmost importance, that the possibility of use of an identification or credit card by an unauthorized holder be eliminated or at least minimized. On the other hand, since cards such as credit cards may often be used at hundreds of different places, it is highly desirable that any technique for minimizing unauthorized use of a card be inexpensive enough to be economically feasible.

One approach to a solution to this problem is disclosed in U.S. Pat. No. 3,412,493, entitled "Tamper-Proof Record Structure," in which an identification card which may contain the picture, the fingerprint, the name, address, code number, company name, and signature of the authorized holder is made of a record-bearing sheet of an amorphous material on which the indicia which it is desired to protect is recorded, and a standardized diffraction pattern is then stamped into the sheet with at least a portion of the diffraction pattern being in the region of the indicia to be protected. The sheet, with the diffraction pattern stamped into it, is encapsulated in a material which is physically and chemically identical to that of the sheet. The diffraction pattern, which may have a ridge density of about 10,000 lines/inch, causes an observable pattern of prismatic light to be formed, which pattern is permanently and observably altered by the slightest tampering with any of the indicia of the card.

Although such a card is useable as an identification card to control access to a secure facility, it is not applicable to the case of identifying the authorized holder of a numbered Swiss bank account, for instance, where it is desired to keep such details as the name of the holder and the number of the bank account secret.

Another approach to a solution of the problem of providing a secure identification or credit card disclosed in the prior art is to provide a cryptographically encoded verification number on the card which is known by the authorized holder. In order to ensure that the holder of the card is in fact the authorized holder thereof, a decoder is required which compares the cryptographically encoded verification number on the card itself with a number provided the decoder by the holder himself by means of a keyboard or otherwise. The cryptographically encoded verification number may take various forms. In one case known in the prior art, the cryptographically encoded verification number is in the form of a unique combination of a plurality of black and white stripes, which are optically read out through a predetermined one of a plurality of fiber optic decoding translator blocks. This makes it possible to cause the binary number manifested by the black and white stripes on the identification card itself to correspond with any particular predetermined verification number. Thus, a thief or finder of the stolen or lost card could not make use of it, since he would not know the particular predetermined verification number with which the black and white stripes on that card correspond. However, the second approach does not provide the tamperproof feature for the card itself as provided by the first approach described above, so that in the second approach the cards may be simply duplicated, altered or forged with very little skill or knowledge.

One way, suggested by the prior art, for making a card containing a cryptographically encoded verification number more tamperproof is to employ a first optical scrambler, such as a bundle of intertwined optical fibers, as part of the encoder and to employ an identical second optical scrambler as part of a decoder. If there is only a single decoder to be used with a single encoder, providing such identical optical scramblers is simple. A bundle of optical fibers is provided in which the opposite ends of each of the optical fibers in the bundle occupy similar corresponding positions with respect to the ends of the other optical fibers in the bundle, but in which the optical fibers are intertwined in a random manner between the ends of the bundle. If now the bundle is cut into two separate parts between the opposite ends thereof, one part may be utilized as an optical scrambler in an encoder while the other part may be utilized as an optical descrambler in a single decoder. However, to provide a plurality of optical descramblers each and every one of which is capable of descrambling the same optically scrambled coded information is, if possible, very difficult and certainly very expensive. Therefore, optical scrambling is not economically feasible in an identification system in which a plurality of separate decoders are employed.

The holographic identification system of the present invention not only provides both a cryptographically encoded verification number, as does the second approach described above, and a tamperproof card, as does the first approach described above, but is capable of operating with a plurality of separate inexpensive decoders.

In accordance with the present invention an identification or credit card has a given number associated therewith. The card includes a given hologram as an integral part thereof. The hologram comprises a record in holographic form of object information manifesting a predetermined binary code of the number. The predetermined binary code comprises a given pattern of spaced points certain ones of which are each characterized by the presence of predetermined light radiation and the remaining ones of which are each characterized by the absence of this predetermined light radiation therefrom. When such a hologram is illuminated with an appropriate readout beam of light a reconstructed image of the given pattern is obtained, and an appropriate decoder having a separate light sensing element located at each point of the reconstructed pattern can determine the given number associated with this card in accordance with the predetermined binary code manifested by the reconstructed image of the given pattern.

When each of a plurality of identification credit cards have different numbers associated therewith, the predetermined binary codes of different numbers comprise the same given pattern of spaced points with each different number corresponding to a different set of certain ones of the spaced points each characterized by the presence of predetermined light radiation therefrom and the remaining ones of the spaced points of that set each characterized by the absence of this predetermined light radiation therefrom.

It is therefore an object of the present invention to provide a secure identification card system employing holograms.

This and other objects of the present invention will become more apparent from the following detailed description taken together with the accompanying drawing, in which.

Figure 1:
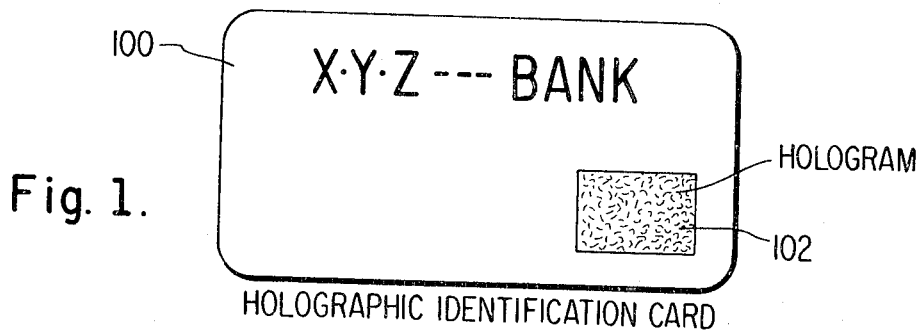
FIG. 1 illustrates a sample of a typical credit or identification card employed in the holographic identification system of the present invention.

Referring now to FIG. 1, holographic identification card 100 may be similar to conventional identification or credit cards in size, in shape, and in including certain printed matter thereon, such as "XYZ Bank," for instance. However, holographic identification card 100 differs from a conventional identification or credit card in that it includes as an integral part thereof at some predetermined position on the card, such as near the lower right end of the card for example, a hologram 102 which contains information in holographic form manifesting a number associated with that particular holographic identification card. Of course, different cards may have different numbers associated therewith.

Hologram 102 may be either an amplitude or a phase hologram and it may be either a transmissive or a reflective hologram. However, for the purposes of this discussion it will be assumed to be a transmissive amplitude hologram. The entire holographic identification card may be made of plastic or it may be encapsulated in transparent plastic, as is conventional. In any case, it is most desirable, for security purposes, that hologram 102 be incorporated into card 100 in such a manner that it is impossible to remove hologram 102 without observably and permanently altering card 100.

For instance, card 100 may be formed from separate front and back halves of plastic material both having congruent window openings of a given size for the insertion of hologram 102 therebetween. If hologram 102 is recorded on a film having a size somewhat larger than the window openings in the plastic halves of card 100 and the front and back halves of plastic material of card 100 are bonded to each other to form an integral card with hologram 102 filling the window opening therein, hologram 102 could not be removed or replaced without observably and permanently altering card 100.

Figure 2A:
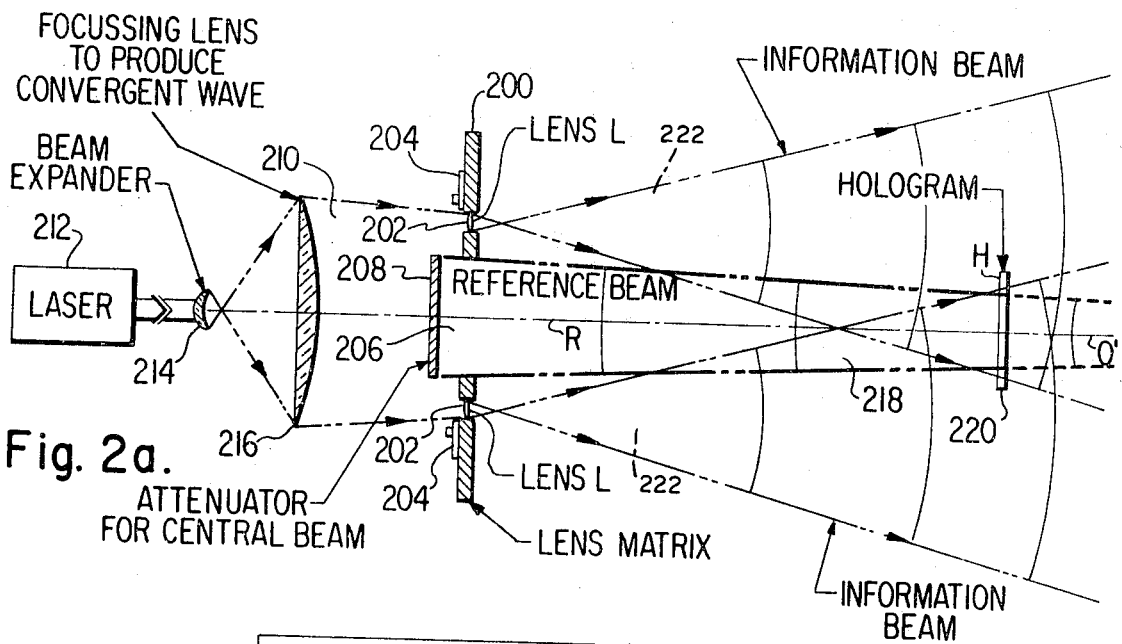
FIGS. 2a and 2b are schematic diagrams of the apparatus employed in recording a hologram for use in the holographic identification system of the present invention.
Figure 2B:
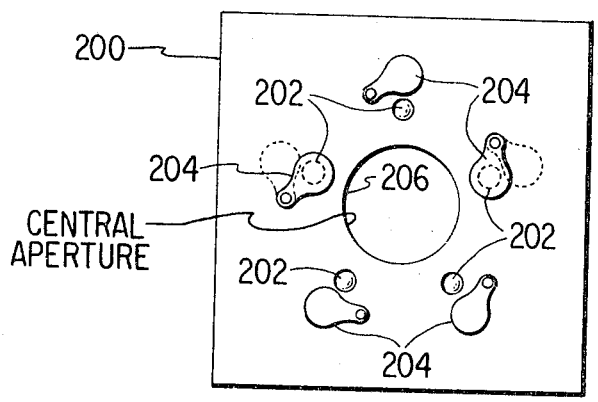

Referring now to FIGS. 2a and 2b, there is shown an embodiment of apparatus for recording a hologram manifesting in holographically coded form any one of a plurality of numbers. In particular, otherwise opaque lens matrix 200 includes a plurality of similar convex lenses 202 arranged in a given pattern of spaced points. For illustrative purposes in FIGS. 2a and 2b the number of lenses 202 and, hence, the number of spaced points in the given pattern is five and the given pattern is the arrangement of the five lenses 202 at equally spaced points on the circumference of a circle of given radius. In practice, the plurality of spaced points of lens matrix 200 which includes a lens 202 may be considerably more than five, such as 10, 15, 20 or even more. Also, the given pattern of the spaced points at which lenses 202 are located need not be on the circumference of a circle of given radius, as shown in FIGS. 2a and 2b.

Each of lenses 202 has an individual movable opaque shutter 204 associated therewith. Each of these shutters may be positioned to cover the lens with which it is associated, as is shown in FIG. 2b for the case of the upper left and the upper right lenses 202, or it may be positioned to leave uncovered the lens with which it is associated, as shown in FIG. 2b for the case of the upper, the lower left and the lower right lenses 202. With five lenses there are $2^5$ or 32 possible combinations of covered and uncovered lenses. (With 10 individual lenses rather than five, there would be more than 1,000 possible combinations of covered and uncovered lenses, while with 20 lenses there are more than 1 million possible combinations of covered and uncovered lenses.) In accordance with any chosen predetermined code, each possible combination may be utilized to represent a different arbitrary number, or, in the alternative, more than one of the possible combinations may be utilized to manifest the same predetermined arbitrary number as each other, and/or other possible combinations may represent no number. The important fact is that whatever predetermined code is chosen, it is known a priori both for encoding and for decoding purposes.

Lens matrix 200 further has a centrally located aperture 206 therethrough. As shown in FIG. 2a, in front of central aperture 206 is located an optical attenuator 208 composed of a material which partially absorbs and partially transmits light energy impinging thereon.

As shown in FIG. 2a, a relatively wide convergent wave of monochromatic, spatially coherent light energy 210 is formed from the output of laser 212 by beam expander lens 214 and focusing lens 216. A central portion of beam 210 passes through and is attenuated by attenuator 208 to form reference beam 218 which impinges on light wave recording medium 220, as shown in FIG. 2a. The peripheral portion of convergent wave 210 impinges upon lens matrix 200 including those ones of convex lenses 202 which are at that time not covered by their shutters 204. This will result in an individual diverging information beam 222 being derived from only each of those ones of convex lenses 202 which are not at that time covered by its shutter 204.

A portion of each information beam 222 which is derived will illuminate light recording medium 220. The exposure of light recording medium 220 to reference beam 218 and each of the information beams 222 impinging thereon will result in light recording medium 220 recording a hologram interference pattern which contains in holographic form information as to which one of lenses 202 were uncovered by shutter 204 at the time the hologram was recorded, and, because the given pattern of lenses 202 on lens matrix 200 is known a priori, information as to which ones of the lenses 202 were covered by shutters 204 at the time the hologram was recorded. Therefore, the hologram contains in holographic form information as to the number manifested by the particular combination of covered and uncovered lenses which existed at the time the hologram was recorded.

Thus, the number manifested by the recorded hologram is, in effect, doubly coded. First, it is coded by the fact that a given combination of covered and uncovered lenses of the given pattern manifests a predetermined arbitrary number. For instance, the case shown in FIG. 2b, where the top, lower left and lower right lenses are uncovered by shutters 204, while the upper left and upper right are covered by shutters 204, might arbitrarily manifest the number "262." Some other arrangement of covered and uncovered lenses 202, not shown, such as the top, upper and lower right lenses 202 uncovered by shutters 204 with the upper and lower left lenses covered by shutters 204, might arbitrarily manifest the number "413."

The second degree of encoding is accomplished by storing information as to the given pattern as a holographic light interference pattern, which, due to its very high resolution, cannot be altered to manifest a different pattern from that which has been stored on readout of the hologram.

Figure 3:
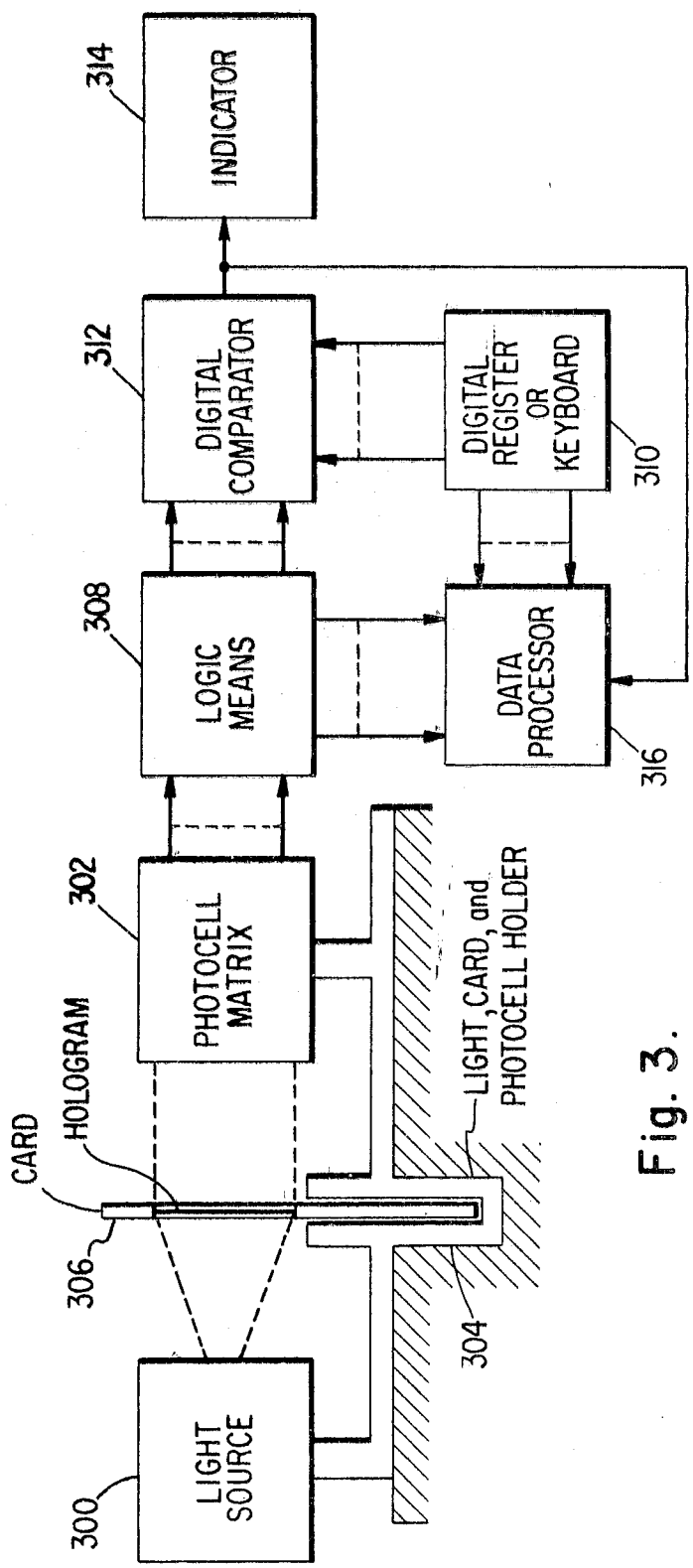
FIG. 3 is a block diagram of a decoding system for use in the holographic identification system of the present invention.

Referring now to FIG. 3, there is shown an embodiment of one form which a decoding system may take for a holographic identification card of the type shown in FIG. 1, which includes a hologram as an integral part thereof which has been recorded in the manner discussed above in connection with FIGS. 2a and 2b.

Figure 4A:
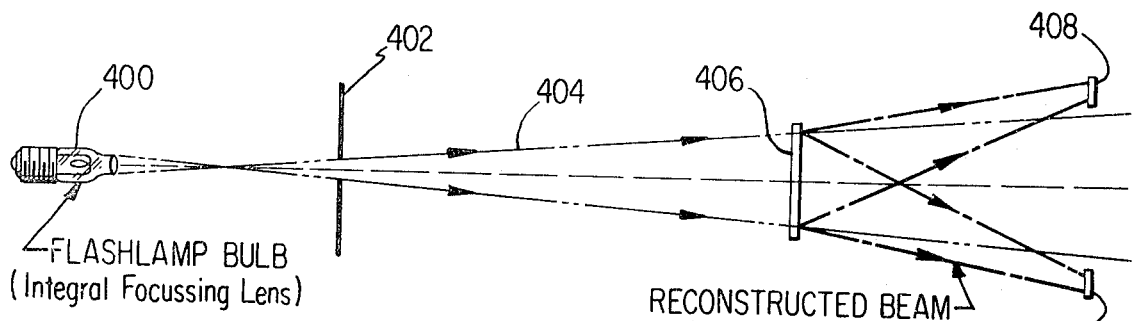
FIGS. 4a and 4b are schematic diagrams of an embodiment of the optical portions of the decoding system shown in FIG. 3.

The decoding system of FIG. 3 includes an optical portion, shown in more detail in FIG. 4 to be discussed below, comprising light source 300 and photocell matrix 302 which is supported in fixed orientation with respect to light source 300 by holder 304. Holder 304, as shown, also includes means for supporting the holographic identification card 306 then being read out in reasonably fixed relationship with respect to both light source 300 and photocell matrix 302 so that the hologram of card 306 is illuminated by a readout beam from light source 300 which causes a reconstructed real image of the pattern information stored in the hologram to be reproduced and picked up by the photocells, or light sensing elements, of photocell matrix 302 in a manner to be described below in connection with FIGS. 4a and 4b. The decoding system of FIG. 3 also includes an electrical portion comprising the electrical output of photocell matrix 302, logic means 308, digital register or keyboard 310 digital comparator, indicator 314, and data processor 316.

Before proceeding with the description of the decoding system of FIG. 3, the embodiment of the optical portion thereof shown schematically in FIGS. 4a and 4b will now be discussed. Although light source 300 of FIG. 3 could be a monochromatic coherent light wave from a laser, in order to make the decoder as inexpensive as possible, light source 300 is preferably a polychromatic noncoherent light wave such as may be obtained from a conventional flashlight lamp bulb 400 having an integral focusing lens. Light source 300 also preferably includes a beam limiting aperture 402 through which a divergent readout beam of polychromatic noncoherent light 404 emerges. Beam 404 is incident on hologram 406 of the holographic identification card then being read out. The divergence of readout beam 404 is related to the convergence of the reference beam 206, discussed above, utilized in recording the hologram in a manner such as to produce a real reconstructed image of a pattern corresponding to the uncovered ones of the lenses 202 of FIG. 2 which existed at the time of the recording of hologram 406.

Because of the polychromatic nature of the readout beam, each of these uncovered lenses will be represented in the reconstructed image by a spot of light of finite size, such as 2 millimeters, for instance, which has an effective center, or center of gravity, at a predetermined point in the image plane which is determined by the position of the lens with which it corresponds in the given pattern of lens matrix 200 of FIG. 2b. As shown in FIGS. 4a and 4b the photocell matrix 302 includes a plurality, such as five, of photocells 408 arranged in the same given pattern as the plurality of lenses 202 of the lens matrix 200 of FIG. 2b. Each of photocells 408, which is larger than the spot of light with which it corresponds, is situated in the reconstructed real image plane of hologram 406 and positioned to correspond with a particular separate one of the spaced points of the given pattern manifested by the arrangement of lenses 202 in lens matrix 200. The given pattern is initially chosen to ensure that the spacing between points is greater than the size of a photocell, so that there is no overlapping of adjacent light spots or adjacent photocells.

Figure 4B:
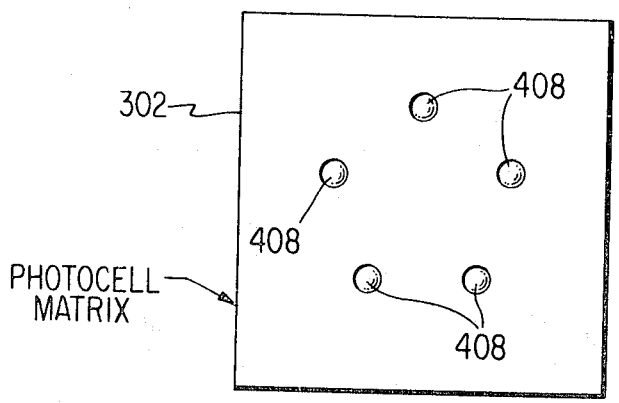

If a particular one, such as the upper one of lenses 202 of lens matrix 200 is uncovered at the time that the hologram 406 was recorded, the upper photocell 408 of FIG. 4b, which correspond with upper lens 202 of FIG. 2b, will be illuminated with a spot of light formed by the reconstruction of hologram 406. On the other hand, if this upper lens 202 of lens matrix 200 was covered by its shutter 204 at the time hologram 406 was recorded, upper photocell 408 of photocell matrix 302 will not be illuminated. In this manner, the pattern of illuminated and nonilluminated photocells 408 of matrix 302 serves to partially decode the doubly coded number associated with the holographic identification card then being read out by removing the holographic code portion.

The particular combination of photocells 408 having light impinging thereon each produce a first electrical signal in response thereto, which first electrical signals correspond on a one to one basis with the combination of uncovered lenses of lens matrix 204 at the time hologram 406 was recorded. Each of the rest of photocells 408, which do not have light impinging thereon and which produce a second electrical signal in response thereto, corresponds on a one to one basis with each of the lenses 202 which were covered by their respective shutters 204 at the time hologram 406 was recorded. The first electrical signal can be considered to represent a binary "1" and the second electrical signal can be considered to represent a binary value "0." Thus, the output of photocell matrix 202 will be a predetermined binary code of the particular arbitrary value of the number associated with the holographic identification card then being read out.

Referring back to FIG. 3, the electrical portion thereof will now be further discussed. The electrical output of photocell matrix 302 is applied as an input to logic means 308. Logic means 308, which may comprise a plurality of appropriately interconnected AND gates, is a translator responsive to the set of binary information appearing on the output conductors from photocell matrix 302 applied as an input thereto for producing as an output therefrom in digital form the arbitrary number associated with the card then being read out. The output from logic means 308 is applied as a first input to digital comparator 312. Digital register or keyboard 310 is utilized to apply as a second input to digital comparator 312 digital signals manifesting a second number which is either registered in the digital register or entered by means of the keyboard of block 310 by the holder of the identification card. If the first number from logic means 308 and the second number from digital register or keyboard 310 are identical to each other digital comparator 312 will apply a first signal to indicator 314 to indicate this fact. Otherwise, no such signal will be applied to indicator 314 or, in the alternative, a second signal indicative of the fact that two numbers applied to digital comparator 312 are not identical to each other will be applied to indicator 314. Indicator 314 may include indication lights, buzzers, alarms, meters or any other well-known type of indication means.

Although not required, it may be desired to provide data processor 316 with information as to the number associated with the card then being read out from logic means 308 and an authorization signal from the output of digital comparator 312 indicating that the holder of the card then being read out is an authorized holder. Digital register or keyboard 310, in addition to being used to provide a second input to digital comparator 312, as described above, may be used to provide additional information associated with a particular transaction to data processor 316.

In the foregoing discussion, it was assumed that holographic identification card 306 was being used as either an identification card for the purpose of gaining access to a secure facility or as a credit card. However, other uses for a holographic identification card present themselves. One such use would be as a key for an electronic lock. In such a case, data processor 316 could be replaced with an electronically controlled bolt actuating means responsive to an output from digital comparator 312 indicating that the number associated with the card being read out manifested by the output from logic means 308 is identical to a number stored in the digital register of block 310.

A simple decoder including all the elements of FIG. 3 except data processor 316 may be made quite inexpensively, since light source 300 may be a simple battery operated flashlight, each of the photocells of photocell matrix 302 may comprise comparatively large area cadmium sulfide photoresistors having an active diameter of approximately 6 millimeters (allowing a large lateral positional accuracy tolerance of ±2 millimeters with respect to the 2 millimeter light spot corresponding to each photoresistor), and logic means 308 and digital comparator 312 may be made with compact, inexpensive integrated circuitry.

What is claimed is:

1. A security system comprising a plurality of different cryptographically and holographically encoded tamperproof identification cards and at least one decoder therefor:

a. wherein each particular one of said cards includes a holographic interference pattern resulting from the interference of a particular subset of spaced mutually coherent information light beams which is associated with that particular card, said subset being preselected from a single overall fixed set of a predetermined plurality of mutually coherent light beams which overall fixed set is common to all of said cards, and of a single fixed reference light beam which is mutually coherent and angularly displaced with respect to each of said set of light beams, each different subset corresponding to a different verification number; and b. wherein said decoder includes means for illuminating the holographic interference pattern of any one of said cards to be decoded with a single incident light beam having a given incident cross section thereat, the amplitude and phase of said light beam at each point of said given incident cross section incident at said holographic interference pattern being independent and free of all information content so that said holographic pattern is illuminated with a spatially unmodulated light beam, whereby there results a first-order diffraction pattern consisting of the reconstructed subset of the information light beams associated with the card then being illuminated, a matrix of spaced photocells having a separate photocell corresponding to each respective member of said overall fixed set which is positioned to be illuminated only when a reconstructed information beam corresponding to that member is included in the subset associated with the card then being illuminated, each of said photocells producing a first output signal when illuminated by a reconstructed information beam and a second output signal when not illuminated by a reconstructed information beam, and logic means coupled to each of said photocells of said matrix and responsive to the distribution among the photocells of said first and second output signals for deriving the verification number of the card then being decoded.

2. The system defined in claim 1, wherein said decoder means further includes a comparator coupled to said logic means for applying said verification number derived thereby as a first input to said comparator, register means for independently applying another number as a second input to said comparator, and utilization means coupled to said comparator for producing a given response only if said other number has a predetermined relationship with respect to said verification number.

3. The system defined in claim 2, wherein said predetermined relationship is that said numbers are identical to each other.

4. The system defined in claim 1, wherein said illuminating means of said decoder provides as said single incident light beam a beam of noncoherent polychromatic light, whereby each reconstructed information beam forms a spot of light covering a given area at said matrix, and wherein the minimum spacing between adjacent photocells of said matrix is significantly greater than the dimensions of said given area, whereby no two spots can overlap.

5. The system defined in claim 4, wherein the area and dimensions of each of said photocells is significantly larger than the given area and dimensions of the light spot formed by a reconstructed information beam incident thereat to ensure complete interception of that entire light spot thereby.

* * * * *

UNITED STATES PATENT OFFICE
CERTIFICATE OF CORRECTION

Patent No. 3,643,216　　　　　　　　　Dated February 15, 1972

Inventor(s) David Leslie Greenaway & John Patrick Russell

It is certified that error appears in the above-identified patent and that said Letters Patent are hereby corrected as shown below:

Title page - Foreign Application Priority Data -

"Switzerland" should be changed to --Great Britain--

Signed and sealed this 3rd day of October 1972.

(SEAL)
Attest:

EDWARD M. FLETCHER, JR.　　　　　　ROBERT GOTTSCHALK
Attesting Officer　　　　　　　　　Commissioner of Patents